Figure 1:
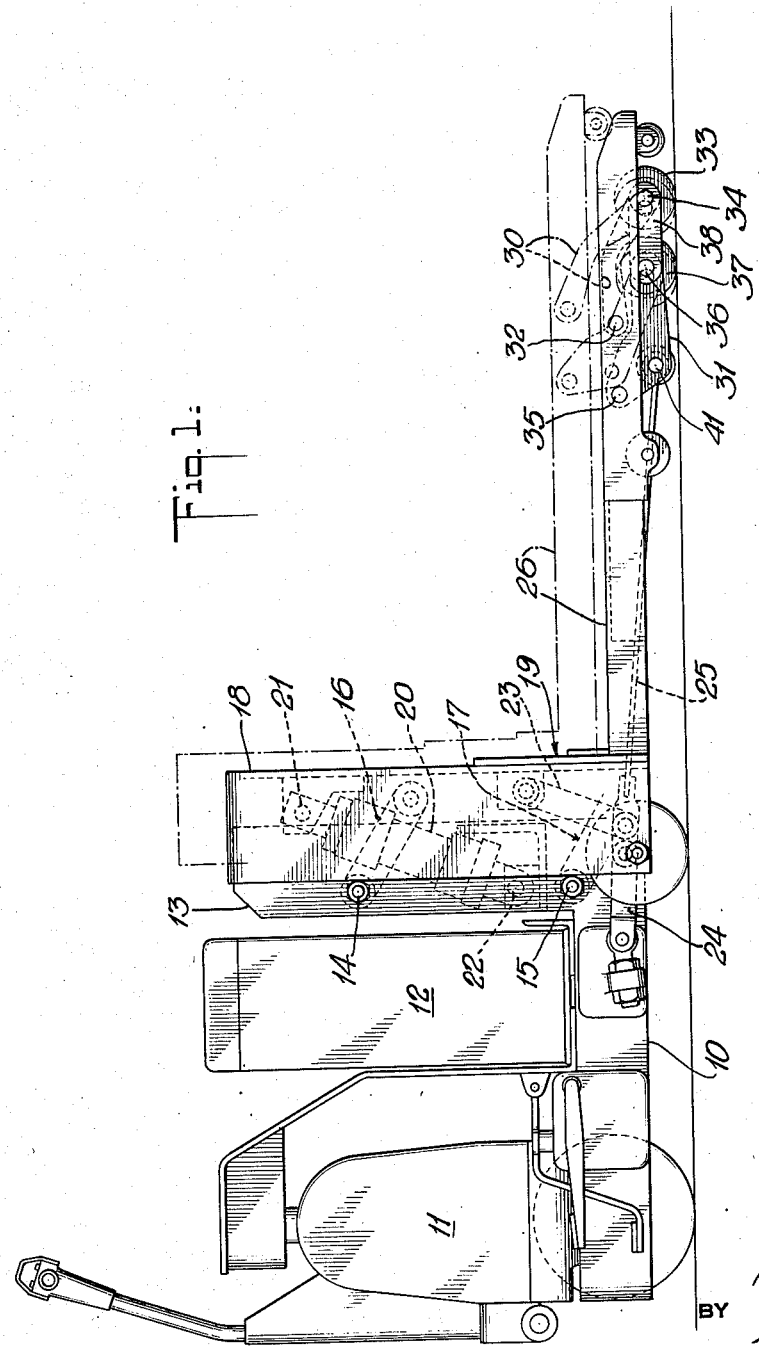

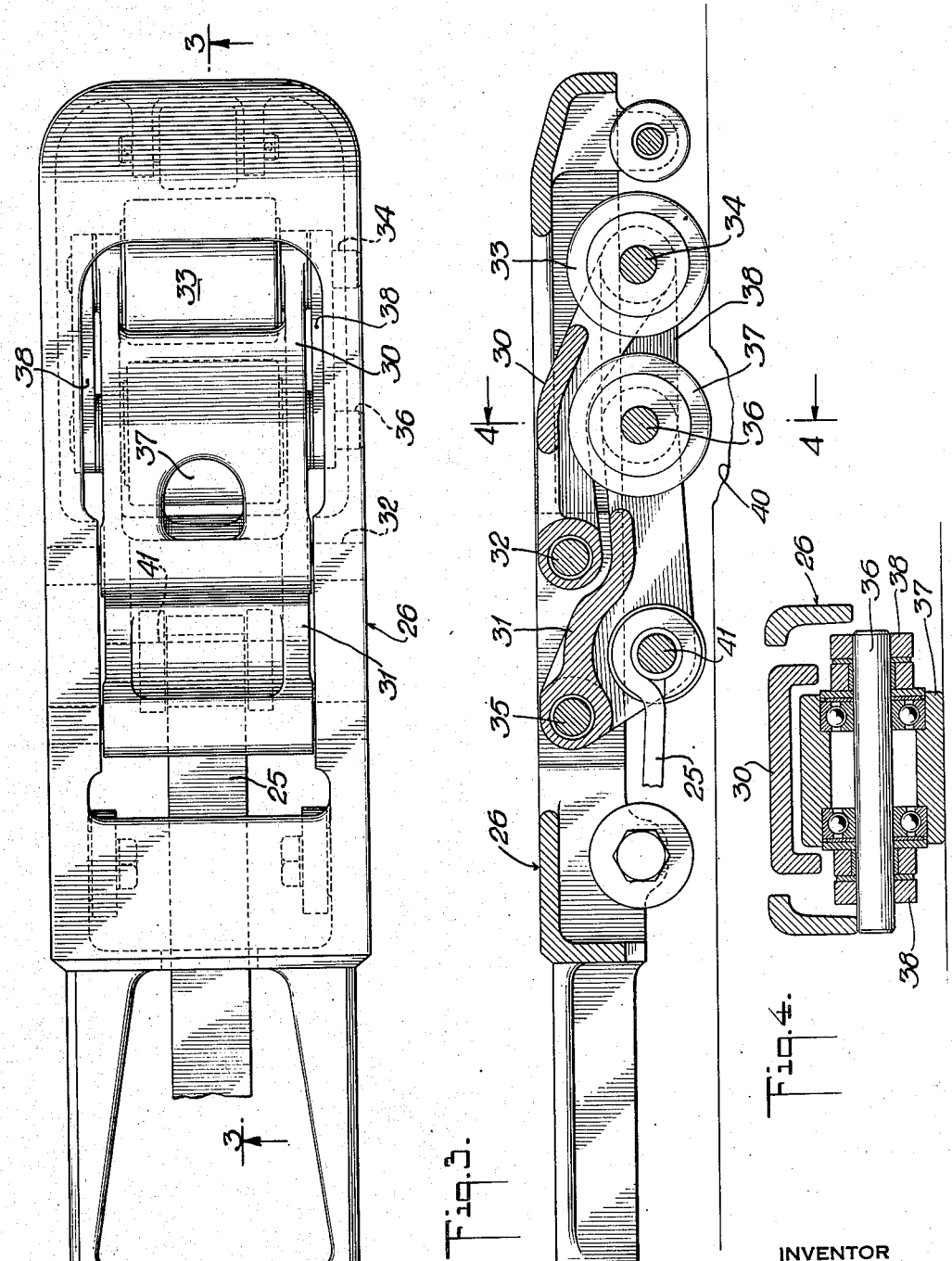

Patented Apr. 24, 1951

2,550,548

UNITED STATES PATENT OFFICE 2,550,548

PALLET TRUCK

Herbert J. Framhein, Chicago, Ill.

Application August 26, 1947, Serial No. 770,670

5 Claims. (Cl. 254—10)

This invention relates to a truck, and more particularly to that type of truck that is shown and described in my Patent No. 2,417,395. In trucks of the particular class, the forward end is known as a lifting head while the rear portion of the truck is designated an elevating platform. The forward end of the elevating platform is mounted for lifting movement relatively to the lifting head and generally has such movement imparted thereto by a hydraulic ram.

Trucks of the particular class are adapted for use with pallets generally equipped with upper and lower floors that are closely spaced. Therefore, the elevating platforms of trucks of the class described must be very low relatively to the ground, frequently less than three inches in height, in order to enter between the floors of the pallet. It is customary, further, to mount under the rear end of the elevating platform of the trucks of the class described, opposed lifting wheel links pivoted to the platform and each having mounted thereon a lifting wheel. Means are provided for rotating the lifting wheel links about their pivots as the forward end of the elevating platform is raised, thereby raising the rear end of the elevating platform simultaneously with the forward end.

Because the lifting wheel carried by each lifting wheel link is necessarily very small in diameter, it follows that any obstacle placed in its path will greatly increase the tractive pull that is required to move the truck. This is especially true where the wheel enters a depression or hole in a floor. In that case, due to its small peripheral diameter, the wheel will actually almost block the truck against movement.

Many efforts have been made to contribute a truck of the class described in which the lifting wheels will not hinder the movement of the truck in the manner set forth, but so far as I know, no successful truck of the class described has yet been contributed to the art, and the problem here outlined remains unsolved. It is the object of my invention to contribute a truck of the class described, and using small lifting wheels, in which no real obstacle will be presented against the movement of the truck where the floor on which the truck is moved contains small openings and depressions.

As a feature of my invention whereby the objects thereof are attained, I utilize a pair of longitudinally spaced lifting wheel links at each side of the truck and each carrying a wheel thereon, with the lifting wheel links rotatable together relatively to the truck elevating platform.

As a still further feature of the invention, the lifting wheel links are adapted for parallelogram coaction so that the wheels carried thereby will move in parallelism. With this arrangement, should one wheel tend to move into a depression or the like, it will actually be held out of the depression because of the contact between the other wheel and the floor or ground. I have found by actual trial that a truck constructed in accordance with my teachings will move over a rough floor, or a floor formed with holes and depressions, without presenting the extreme difficulties of prior art trucks.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Referring now to the drawings:

Fig. 1 is an elevation of a truck of the general class described, showing my invention therein embodied. Fig. 2 is a view looking downwardly on one leg of the truck platform. Fig. 3 is a section taken along lines 3—3 of Fig. 2. Fig. 4 is a section taken along lines 4—4 of Fig. 3.

Referring now more particularly to the drawings, the truck in which my invention is embodied is shown formed with a lifting head 10 having a forward steering and traction unit 11 and a battery 12. The lifting head is further equipped with a rear vertical standard 13, and pivoted to the standard 13 at 14 and 15, are links 16 and 17 extending from the vertical standard 18 of the elevating platform 19 of the truck. A hydraulic ram 20 is positioned between points 21 and 22 of the elevating platform and the lifting head respectively, and is adapted to lift the forward end of the elevating platform relatively to the lifting head. Through means of suitable links 23 and 24, the lifting movement of the forward end of the elevating platform is accompanied by a pull on a tension rod 25. There are two such rods 25, one under each leg 26 of the U-shaped platform of the truck. At this point it will be well to indicate that the truck so far set forth is fully and completely described in my patent supra, and the construction thereof is not per se the invention covered by this application. I shall now proceed to disclose the novel features of the invention of this application.

In the usual truck such as shown in my patent supra and so far here described, the tension rod 25 under each leg 26 of the U-platform is adapted to rotate a lifting wheel link having a lifting wheel thereon. In my invention, instead of using one lifting wheel link for each leg of the U-platform of the truck, I use two lifting wheel links, one being designated generally by reference numeral 30 and the other by reference numeral 31. Lifting wheel link 30 is pivoted about a shaft 32 relatively to the particular leg 26 of the elevating platform 19 of my truck illustrated in Figs. 2 and 3. Mounted on lifting wheel link 30 is a wheel 33 of extremely small diameter rotatable about an axle 34 supported on the link 30. It will be noted that the link 30 extends horizontally rearwardly from the pivot shaft 32 and then downwardly at an angle toward the ground.

A second lifting wheel link 31 is mounted on each leg 26 of the U-platform through a pivot shaft 35 and carries on an axle 36, a wheel 37. It will be noted that link 31 extends downwardly and then horizontally so that wheel 37 may lie under link 30 and in close coupled relation to the wheel 33. It will further be noted that the linear distance between the axes of shaft 32 and axle 34 is the same as the linear distance between shaft 35 and axle 36. It will, moreover, be appreciated that when the leg 26 of the elevating platform is horizontal, the line between the pivot shafts 35, 32 will also be horizontal, and a line between axles 36, 34, will, of course, also be horizontal.

A link 38, as best seen in Figs. 2 and 4, is secured at its ends to the axles 34, 36 to hold the axles with their centers spaced exactly the same distance as the centers of shafts 32, 35. Naturally there are two such links 38, one at each side of the axles 34, 36. Because of the particular arrangement, the links 30, 31 are adapted for parallelogram action. Therefore, should the wheel 37 move over a broken portion 40 of the floor or ground, it will not enter the depression 40, but will remain above it, as well illustrated in Fig. 3, the entire load being then supported by the wheel 33. This is due to the fact that there is no compensation between wheels 33 and 37, and because of the parallelogram action indicated.

Tension rod 25 is pivoted at 41 to the link 31, and through the short links 38 to the link 30. Because of this arrangement, a pull on the tension rods 25 of two legs 26 of the platform will effect the lifting movement of the wheels 33, 37 on the links 30, 31 from the full line position to the dash and dotted line position of Fig. 1.

Those skilled in the art will now fully appreciate that I have contributed a truck in which I am able to use the lifting mechanism well known and well developed by the prior art together with the small lifting wheels required by the standard pallet construction of the art. It will further be appreciated that through my arrangement I make it possible to pull a truck of the class described over a relatively rough floor or other terrain, without the difficulties inherent in present structures. I believe that the complete utility and value of my invention, as well as its great simplicity, will now be understood and appreciated by those skilled in the art.

I now claim:

1. In a truck of the class described, a wheel supported lifting head, an elevating platform supported at its forward end on said lifting head, means for lifting the forward end of said elevating platform relatively to said lifting head, a pair of lifting links pivoted to the rear end of said platform at each side thereof in longitudinally spaced but close coupled relation, a lifting wheel mounted on each lifting link with said wheels being all of the same diameter, the distance between each pivot and each wheel axis equal, means for rotating said lifting links on their pivots and relatively to said platform as the forward end of said elevating platform is lifted relatively to said lifting head, and means of connection between said links for moving both said links simultaneously.

2. In a truck of the class described, a wheel supporting lifting head, an elevating platform pivoted at its forward end to said lifting head for upward pivotal movement relatively thereto, four lifting links, means pivoting two of said links on each side of said elevating platform at longitudinally spaced points maintained at the same level horizontally when said elevating platform is held in a predetermined position, a lifting wheel mounted on each of said links with the axes of said wheels maintained in the same level horizontally when said elevating platform is in said predetermined position, said wheels being all of the same diameter, means whereby said links are maintained functionally parallel in all positions thereof, and means for lifting the forward end of said elevating platform relatively to said lifting head and simultaneously rotating said lifting links on their pivots and relatively to said platform.

3. In a truck of the class described, a lifting head, an elevating platform pivoted at its forward end to said lifting head for upward pivotal movement relatively thereto, a lifting link pivoted to the underside of said platform and extending substantially horizontally rearwardly from said pivot under said elevating platform and then downwardly, a lifting wheel rotatably mounted on the rear end of said lifting link, a second lifting link pivoted to the underside of said platform just longitudinally forwardly of said first lifting link and extending rearwardly downwardly and then substantially horizontally, a second lifting wheel rotatably mounted on the rear end of said lifting link under a part of said first lifting link and in close coupled relation to said first wheel, means of connection between said links whereby they move together, and means for lifting the forward end of said elevating platform relatively to said lifting head and simultaneously rotating said lifting links on their pivots and relatively to said platform.

4. In a truck of the class described, a lifting head, an elevating platform pivoted at its forward end to said lifting head for upward pivotal movement relatively thereto, a lifting link pivoted to the underside of said platform and extending substantially horizontally rearwardly from said pivot under said elevating platform and then downwardly, a lifting wheel rotatably mounted on the rear end of said lifting link, a second lifting link pivoted to the underside of said platform just forwardly of said first lifting link and extending rearwardly downwardly and then substantially horizontally, a second lifting wheel rotatably mounted on the rear end of said lifting link under a part of said first lifting link and in close coupled relation to said first wheel, the pivot axes of said lifting links being at the same level and the axes of said wheels being also at the same level when said elevating platform is in a predetermined position, means of connection between said links whereby they move together on their pivots, and means for lifting the forward end of said elevating platform relatively to said lifting head and simultaneously rotating said lifting links on their pivots and relatively to said platform.

5. In a truck of the class described, a lifting head, an elevating platform pivoted at its forward end to said lifting head for upward pivotal movement relatively thereto, a lifting link pivoted to the underside of said platform and extending substantially horizontally rearwardly from said pivot under said elevating platform and then downwardly, a lifting wheel rotatably mounted on the rear end of said lifting link, a second lifting link pivoted to the underside of said platform just forwardly of said first lifting link and extending rearwardly downwardly and then substantially horizontally, a second lifting wheel rotatably mounted on the rear end of said lifting link under a part of said first lifting link and in close coupled relation to said first wheel, said lifting link pivot and wheel axes being positioned so that said links are adapted for parallelogram action, means holding said links in a parallelogram arrangement for simultaneous rotation on their pivots, and means for lifting the forward end of said elevating platform relatively to said lifting head and simultaneously rotating said lifting links on their pivots and relatively to said platform.

HERBERT J. FRAMHEIN.

REFERENCES CITED

The following references are of record in the file of this patent:

UNITED STATES PATENTS

| Number | Name | Date |
|---|---|---|
| 2,077,265 | Reed | Apr. 13, 1937 |
| 2,093,392 | Quayle | Sept. 14, 1937 |
| 2,417,395 | Framhein | Mar. 11, 1947 |

FOREIGN PATENTS

| Number | Country | Date |
|---|---|---|
| 214,487 | Great Britain | Apr. 24, 1924 |